United States Patent
Gretta, Jr.

[11] Patent Number: 5,850,523
[45] Date of Patent: Dec. 15, 1998

[54] METHOD AND SYSTEM FOR MONITORING FIELDBUS NETWORK WITH MULTIPLE PACKET FILTERS

[75] Inventor: Robert E. Gretta, Jr., Austin, Tex.

[73] Assignee: National Instruments Corporation, Austin, Tex.

[21] Appl. No.: 666,116

[22] Filed: Jun. 21, 1996

[51] Int. Cl.⁶ .................................................. G06F 11/00
[52] U.S. Cl. ................................................... 395/200.54
[58] Field of Search .................. 371/20.1; 395/200.54

[56] References Cited

U.S. PATENT DOCUMENTS

| | | | |
|---|---|---|---|
| 5,315,592 | 5/1994 | Conant et al. | 370/85.13 |
| 5,442,639 | 8/1995 | Crowder et al. | 371/20.1 |
| 5,473,607 | 12/1995 | Hausman et al. | 370/85.13 |
| 5,606,668 | 2/1997 | Shwed | 395/200.11 |
| 5,627,829 | 5/1997 | Gleeson et al. | 370/230 |
| 5,648,965 | 7/1997 | Thadani et al. | 370/241 |
| 5,682,476 | 10/1997 | Tapperson et al. | 395/200.05 |

OTHER PUBLICATIONS

Fieldbus Foundation Fieldbus Specification System Architecture, By Fieldbus Foundation, Aug. 28, 1995, pp. 1–40, 1–119, 1–54, 1–55, 1–44, 1–116, 1–66, 1–11, 1–52, & 1–22.

*Primary Examiner*—David Y. Eng
*Attorney, Agent, or Firm*—Conley, Rose & Tayon; Jeffrey C. Hood

[57] ABSTRACT

An improved system and method for monitoring a fieldbus network. The improved method and monitor utilize multiple filters with the capability of simultaneously capturing packets from more than one fieldbus and the ability to apply multiple filters to any single fieldbus. Filtered packets are captured as capture documents and stored in the monitor's memory storage. Filtered packets can be displayed, in real time, on the monitor's display screen. The improved monitor is configured to perform post-capture filtering of captured packets. Post-capture filtering does not destroy data. The improved monitor permits dynamic altering of filter settings. Using this feature, the user can initiate capture using a first filter settings, alter the filter setting while packets are being captured, and apply the altered filter setting to the fieldbus without terminating capture. The altered filtered settings are applied to the fieldbus substantially instantaneously and the packets captured under the altered filter settings are displayed.

14 Claims, 16 Drawing Sheets

METHOD AND SYSTEM FOR MONITORING FIELDBUS NETWORK WITH MULTIPLE PACKET FILTERS

FIELD OF INVENTION

The invention relates to the field of network monitors or bus monitors. In particular, the invention relates to a fieldbus network monitor for monitoring information from multiple fieldbuses simultaneously, applying multiple filters to the packets on each fieldbus, dynamically altering filters during capture, displaying packets in real time and in a readable format that assigns a unique color to each layer of the packets, and post-capture filtering of packets.

BACKGROUND OF THE INVENTION

A fieldbus is a specific type of local area network (LAN) that is used to monitor or control one or more pieces of production equipment. A fieldbus network comprises a plurality of digital devices and control/monitoring equipment that are integrated to provide I/O and control for automated processes. A fieldbus network is typically used in industrial and/or process control application, such as a factory or manufacturing plant. The physical devices in a fieldbus system are connected by the fieldbus.

Fieldbus networks may contain one of four types of devices, these being temporary devices, field devices, interface devices, and monitor devices. Temporary devices are devices attached to one of four network addresses reserved for temporary or visitor use. Temporary devices are typically used for configuration and troubleshooting. Field devices are devices that contain function block application processes or, in other words, devices that perform the I/O and control that automates the plant or factory. All field devices are given a permanent address by the system manager when they are attached to the network. Interface devices perform data display and other interface functions for field devices. Like field devices, interface devices are assigned a permanent address, but interface devices do not necessarily contain function block application processes. Finally, monitor devices are devices that are able to listen to network traffic but are not permitted to transmit onto the network. Monitor devices receive no address when attached to the network, and the other network devices are unaware of the monitor's presence.

A fieldbus network utilizes a four layered communication stack or four layer protocol, including a physical layer, a data link layer, and application layer that is divided into an access sublayer and a messaging sublayer. Transfer of information between field devices is provided by the physical layer and data link layer protocols. The physical layer specifies how signals are sent, the fieldbus data link layer (FDL) specifies how the network is shared and scheduled among devices, and the application layer defines the message formats available to applications for the exchange of commands. Three types of medium are available for the physical layer, these being twisted wire pair, optical fiber, and radio. Communications between application processes in the field devices occurs through the application layer protocols. The application layer is divided into two sublayers, an upper sublayer, defined by the Fieldbus Messaging Specification (FMS), that provides services to application processes, and a lower sublayer, known as the Fieldbus Access Sublayer (FAS), that maps FMS services onto the underlying capabilities of the data link layer.

System management is used in fieldbus networks to coordinate the operation of the various devices in a distributed fieldbus system. System management functions include node address assignment for devices, application clock synchronization, distributed application scheduling across the segment, and support for locating application tags. System management provides the facilities to bring new devices on the segment to an operational state and to control the overall system operation. System management uses FMS to remotely access management information within a device and to directly access the data link layer to carry out its other functions. A single system management entity exists in each device for each datalink segment connected to the device. The entity consists of user applications and a system management kernel. The kernel provides a network coordinated and synchronized set of functions.

In fieldbus networks, information is transmitted along the fieldbus in discrete segments commonly referred to as packets. Packets are passed between the field devices connected to the network. Each packet may contain FDL information, FAS information, and FMS information corresponding to the various architectural layers used in the fieldbus implementation. As in any system, errors can occur in the transfer of information over a fieldbus network. Left undetected, errors can result in the loss of critical information and the incorrect operation of the various devices controlled by the network. Errors can also cause serious damage to the devices in the network.

To detect, analyze, and debug network errors, system designers use network monitors. Fieldbus monitors generally comprise a computer including bus monitoring circuitry that is electronically connected to the network and which monitors or listens for fieldbus packets on the fieldbus. Fieldbus monitor devices passively interact with the network, listening to network traffic but unable to transmit information onto the fieldbus. Early versions of network monitors did not provide for real time error detection. Instead, packets captured by the computer were saved into an electronic storage medium and subsequently analyzed. Because real time error detection is critical in minimizing the loss of information and the malfunctioning of equipment, monitors lacking real time error detection were of limited value.

Subsequent fieldbus monitors, such as the monitor disclosed in U.S. Pat. No. 5,442,639 to Crowder et al. (hereinafter referred to as "Crowder"), include real time error detection but contain numerous other drawbacks which limit their utility. For example, conventional fieldbus monitors do not permit the user to save captured packets for subsequent review and analysis. Instead, the packet information is merely displayed on the display screen. Once the data leaves the display screen, it is gone. Further, prior art fieldbus monitors do not provide for simultaneously capturing packets from more than one bus or applying multiple filters to each bus. Instead, conventional fieldbus monitors initiate the capture of packets from a single bus and apply a single data filter to the packets. Because fieldbus packets contain multiple layers of information, the single filter restriction in prior art monitors is a significant limitation.

For example, the user of a conventional prior art fieldbus monitor cannot isolate and display FMS layer information from a string of packets while simultaneously isolating and displaying FDL layer information from the same packet string in a different display window. Using a conventional single filter monitor, the user would be forced to filter both the FDL and the FMS layers from the packets, capture both layers into a single capture document, and display both layers together. As another example, a fieldbus user may wish to view and capture FDL information from fieldbus address X while simultaneously viewing and capturing FMS information from fieldbus address Y. As in the first example, conventional fieldbus monitors will not be able to meet the users requirements because such monitors lack the capacity to apply multiple filters to the bus and because conventional monitors lack the capability to filter packets based upon the fieldbus address from which the packet originated.

In addition, if the receiver decides to change or adjust filters, the user is required to discontinue capture, change the filter and then continue. This results in an inability to capture and analyze packets during the time that the filter is being changed. Compounding the problems associated with the single filter, conventional monitors do little to enhance the readability of the information contained in the filtered packets. Fieldbus packets are difficult to read under the best of circumstances because the multiple layers of information contained within each packet are not easily distinguished from one another.

Moreover, the single filter that does exist in conventional fieldbus monitors can only be invoked during the capture of data. In such monitors, the packet filter is initiated prior to capture, capture is initiated, and the filtered information is captured and displayed. The information that is not passed through the filter is irretrievably lost. The user cannot subsequently decide that it would be useful to view information that was not selected in his original filter because there is no mechanism for doing so. A monitor that enabled the user to perform filtering operations on data that was previously captured would improve the monitor's utility significantly. With such a "post filtering" monitor, the user could choose to capture all data, assuming that memory size is not a constraint, and perform all of the desired filtering post capture.

Conventional fieldbus monitors also cannot dynamically select filter settings. Instead, the user must initialize the single filter prior to data capture. During data capture, the user is prohibited from altering filter settings. As a result, if the user desires to change the filter settings, he or she must first terminate the capture of data. Aside from the obvious inconvenience, this unnecessary limitation is significant because a user who has discovered a network error or an otherwise interesting packet sequence might wish to change the filter setting without terminating the process that is executing. If the user is forced to halt the system, he or she may be unable to recreate the particular condition thereby increasing the time to debug or troubleshoot the network.

SUMMARY OF THE INVENTION

The present invention comprises an improved bus monitor system and method for monitoring a fieldbus network. The improved method and monitor utilize multiple filters with the capability of simultaneously capturing packets from more than one fieldbus and the ability to apply multiple filters to any single fieldbus. Filtered packets are captured as capture documents and stored in the monitor's memory storage. Filtered packets can be displayed, in real time, on the monitor's display screen. The filter settings and display settings are manipulated with a user friendly graphical interface.

For each filter window, the user selects the fieldbus packet information layers and/or the fieldbus addresses that are to be monitored with that filter. For example, the user can monitor a fieldbus with a first filter that filters FMS layer information at a first address and a second filter that simultaneously filters FDL layer information at a second address. Both filter windows can be simultaneously displayed on the display terminal. Using the FMS layer filter settings, the FDL layer filter settings, and the network address filter setting, the user can precisely specify the information to be displayed.

The improved monitor is configured to capture filtered packets into storage and to perform post-capture filtering of captured packets. As a simple example, a user may filter and capture all available FDL information from the packets on a fieldbus regardless of the network address. If, after the user has captured packets into a capture document using this filter, he or she desires to isolate and view information originating from a specific network address, the post-capture filtering capability of the monitor allows the user to do so. Post-capture filtering does not destroy data. Thus, after performing a first post-capture filtering, the user could then alter the post-capture filter and perform a second post-capture filter on the captured data.

The improved monitor permits dynamic altering of filter settings. Using this feature, the user can initiate capture using a first filter settings, alter the filter setting while packets are being captured, and apply the altered filter setting to the fieldbus without terminating capture. The altered filtered settings are applied to the fieldbus substantially instantaneously and the packets captured under the altered filter settings are displayed.

Broadly speaking, an improved method of monitoring a fieldbus comprises initializing one or more packet filters. The one or more packet filters are concatenated to form a single filter applied to the data. Fieldbus packets traveling over the fieldbus network are received by a receptor and routed to the filter. The filter filters the received packets the data indicated by each of the one or more packet filters. The filtered data is then separated based on each of the filters and is then stored as captured packets. The filtered data for each packet filter is then sent to a display generator for displaying on a display screen.

The improved method of monitoring a fieldbus further comprises, applying a post-capture filter to the captured packets to produce twice filtered packets which can be displayed.

An improved apparatus for monitoring packets comprises a packet receptor which is connected to receive packet filter information, wherein the packet filter information comprises a combination of one or more user-selected packet filters. The packet filter produces filtered data as an output, which is then separated according to the one or more user-selected filters. The filtered data for each user-selected packet is then routed to a storage means for capture. In addition, a display generator is connected to the output of the filter packets for real time displaying of the captured information.

BRIEF DESCRIPTION OF DRAWINGS

Other objects and advantages of the invention will become apparent upon reading the following detailed description and upon reference to the accompanying drawings in which.

Figure 1:
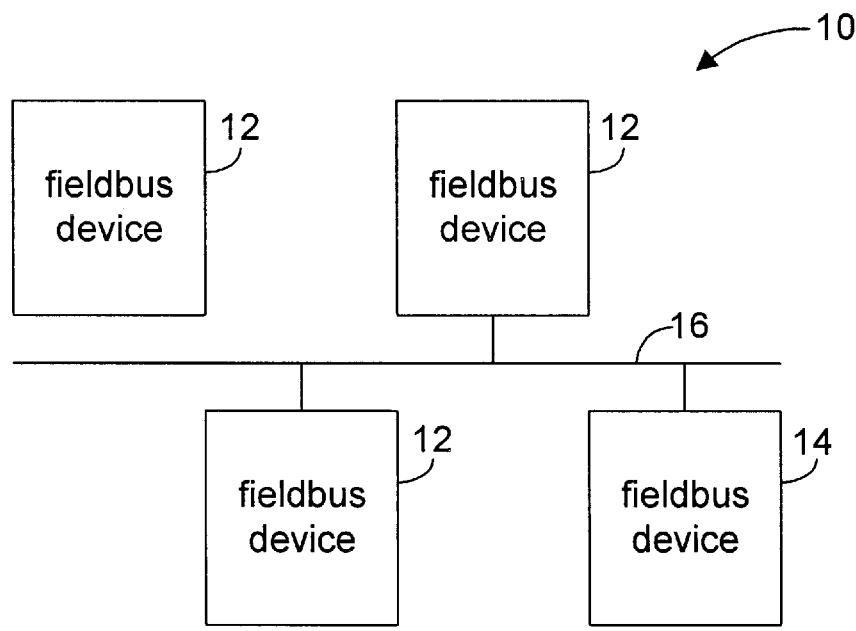
FIG. 1 is a simplified block diagram of a fieldbus network.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE DRAWINGS

Turning now to the drawings, FIG. 1 is a block diagram of fieldbus network 10. System 10 is comprised of a fieldbus 16 and a plurality of fieldbus devices 12 connected to fieldbus 16. An improved monitor 14 according to the present invention is connected to the fieldbus 16. Fieldbus devices 12, monitor 14, and fieldbus 16 are compliant with the Fieldbus Specification published by the Fieldbus Foundation. Fieldbus devices 12 are capable of generating fieldbus packets on fieldbus 16. Each fieldbus device 12 is assigned a permanent network address. Fieldbus monitor 14 passively interacts with fieldbus 16 to monitor packets on the fieldbus. In the preferred embodiment, fieldbus monitor 16 does not provide packets on fieldbus 16.

Figure 2:
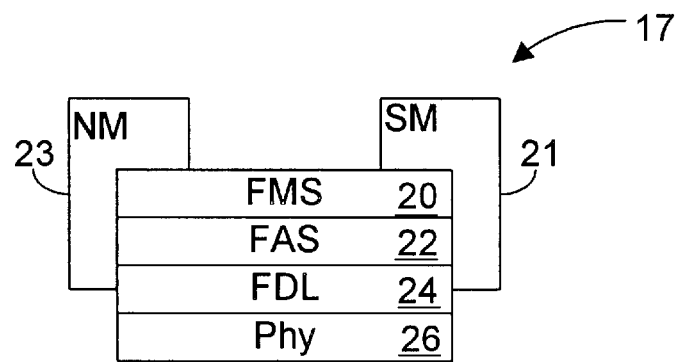
FIG. 2 is a simplified block diagram of a fieldbus protocol stack.

FIG. 2 displays a simplified block representation of fieldbus protocol stack 17. At the base of the protocol stack, physical layer 26 comprises the physical medium over which fieldbus packets travel. In fieldbus network 10, physical layer 26 may be comprised of twisted wire, optical fiber, or radio frequency signals, among others. On top of physical layer 26, fieldbus data link layer (FDL) 24 controls access to fieldbus 16 by the various fieldbus devices 12. FDL 24 informs the user how fieldbus network 10 is scheduling fieldbus devices 12 and how the sharing of fieldbus 16 is being accomplished. At the top of the protocol stack, fieldbus messaging system (FMS) 20 interfaces with and provides services to application software and processes. Fieldbus access layer (FAS) 22 provides an interface between the capabilities of FDL 24 and FMS 20. FIG. 2 also show the interaction between the system management (SM) facilities 21, the Network Management facilities 23 and the various layers of the protocol stack.

Each fieldbus packet may contain data from each layer in protocol stack 17. Separating the various fieldbus protocol layers from one another in the packet can enhance the readability of displayed information and eliminate unwanted layers from the display. As discussed in greater detail below, the improved fieldbus monitor of the present invention is capable of separating individual fieldbus protocol layers and displaying information from the various layers in readable format.

Figure 3:
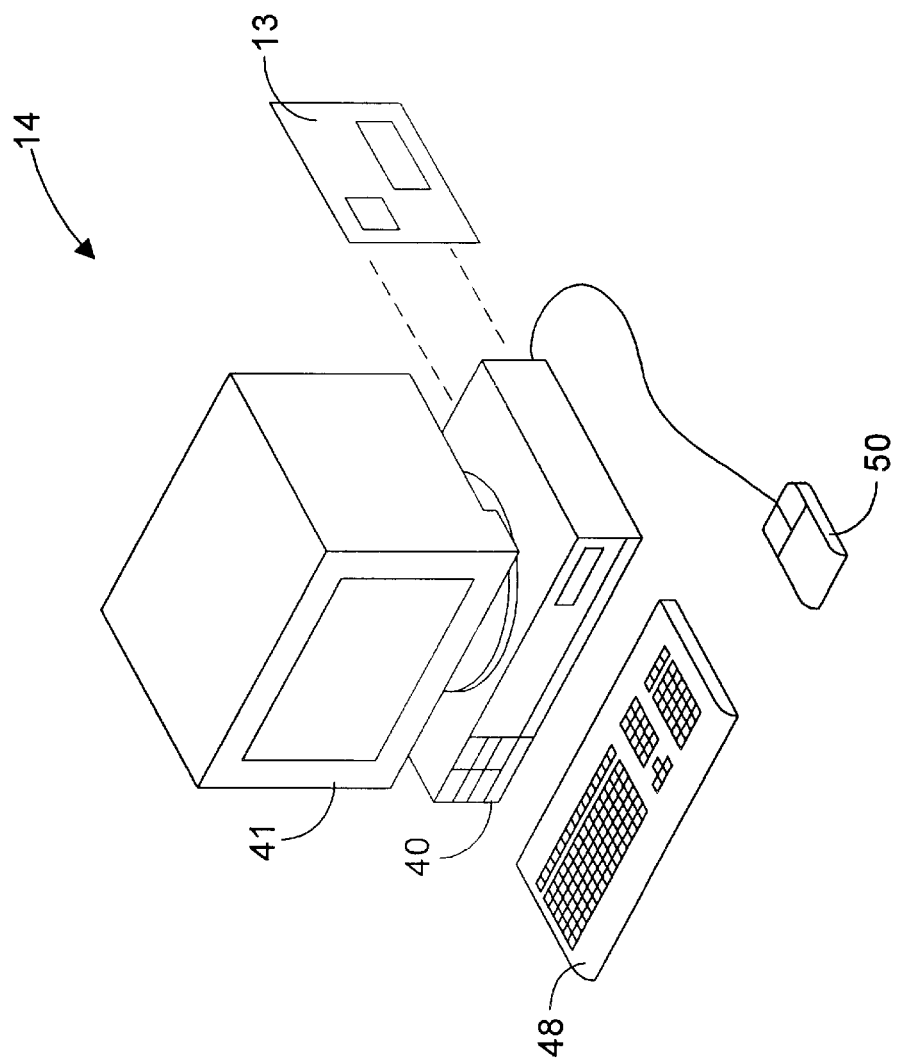
FIG. 3 is a prospective view of one embodiment of an improved fieldbus monitor.

FIG. 3 is a perspective view of an improved fieldbus monitor according to the present invention. Monitor 14 is comprised of a computer 40 having a display screen 41, a keyboard 48 and an alternative input device 50, such as a "mouse" or other pointing device. The computer 40 includes a field bus device or card 13 which performs fieldbus interface functions. Fieldbus card 13 is comprised in computer system 40, but is shown external to the computer system 40 for illustrative purposes. The computer 40 of monitor 14 comprises various standard components, including computer storage or memory 46 and a computer processor 44 (shown in FIG. 4). In a preferred embodiment of monitor 14, the computer is a personal computer with a keyboard and a mouse running under the Windows®, Windows 95®, or Windows NT® operating systems.

Figure 4A:
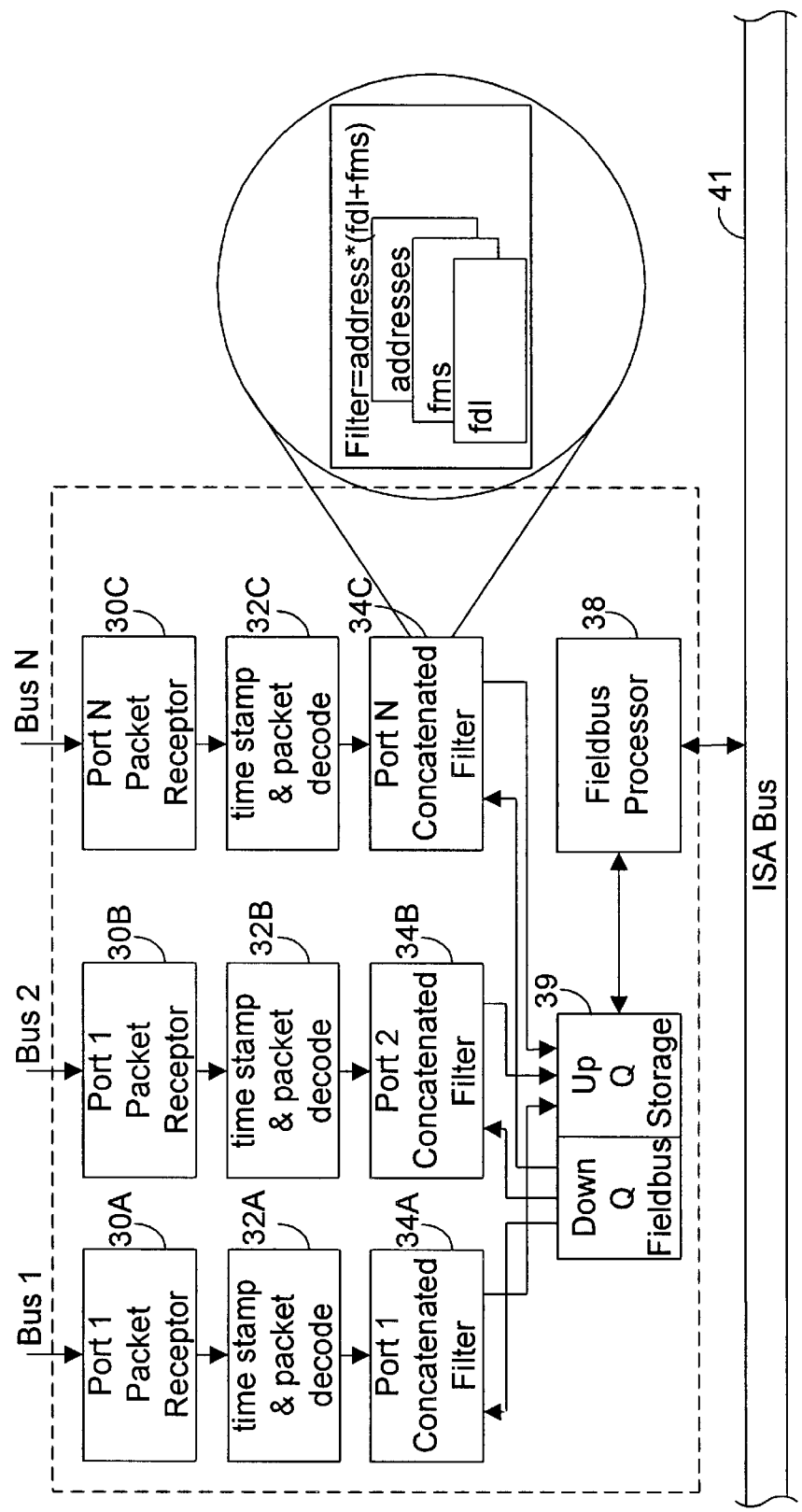
FIG. 4 is a block diagram of one embodiment of an improved fieldbus monitor.
Figure 4B:
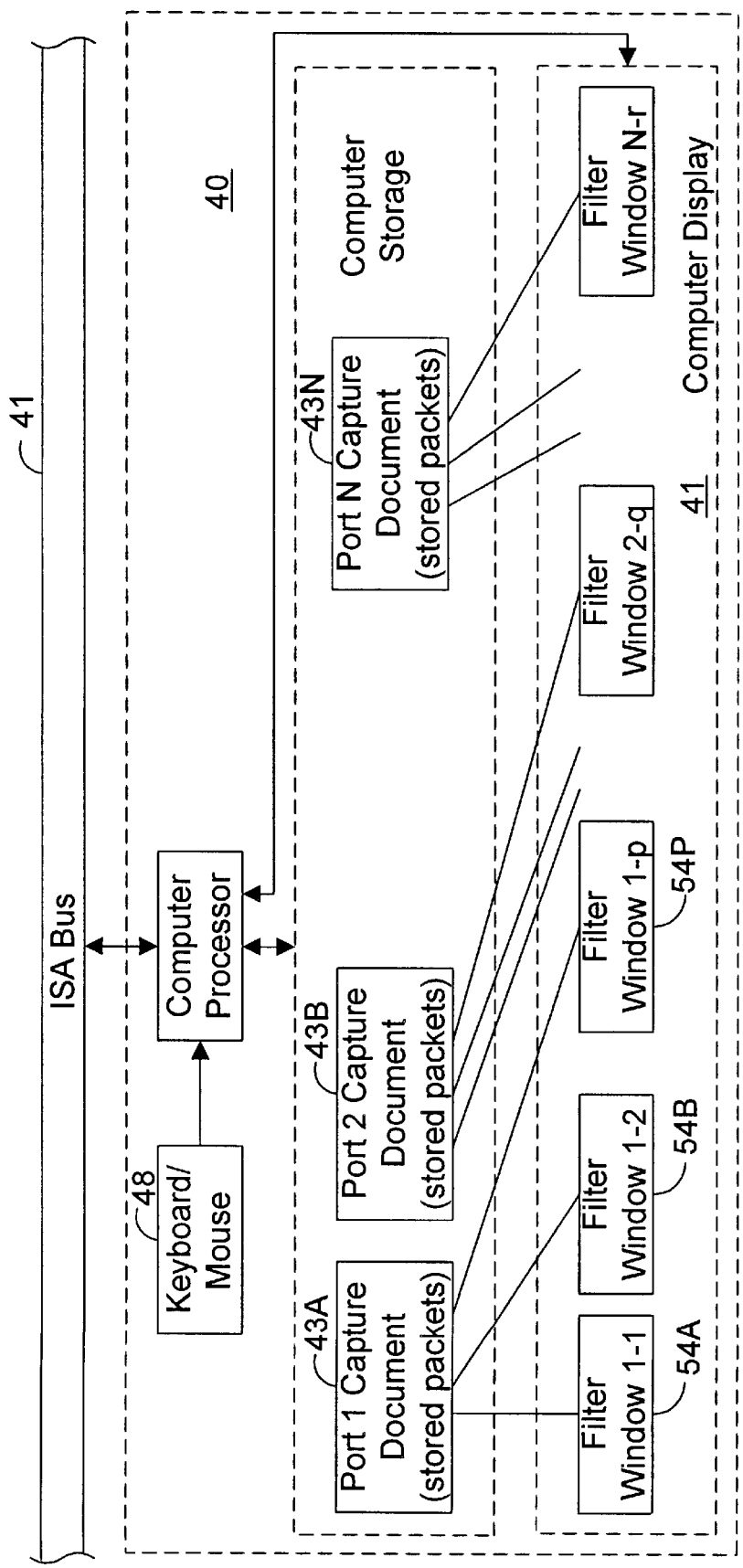

Turning now to FIG. 4, a block diagram of fieldbus monitor 14 is shown. Fieldbus monitor 14 comprises fieldbus card 13 which interacts with computer 40 via ISA bus 41. Fieldbus card 13 has N ports, each connected to a separate fieldbus, for receiving packets from N separate buses. Each port includes a packet receptor (30A, 30B, ..., 30N) and a mechanism for time stamping and decoding each arriving packet (32A, 32B, ..., 32N). After the packets have been time stamped and decoded, they are filtered with the concatenated filters 34A, 34B, ..., 34N. As discussed further below, one or more filter windows per port (i.e. per bus) may be selected by the user. The user defines the information that appears in each filter window by assigning a combination of protocol layers and network addresses to each filter window. All of the filter window settings for a given port are then logically "OR'ed" together to create a single concatenated filter (per port) which is downloaded to fieldbus card 13. The concatenated filter 34N, shown in the exploded view of FIG. 1, demonstrates the concatenation feature. The concatenated filter is formed by "OR'ing" the various protocol layers that the user has specified and "AND'ing" the network addresses that the user has specified. For example, consider a user who wants to monitor packets on the fieldbus connected to port 1. Suppose that the user wants to view the FDL protocol layer information from network address 100 in one filter window and the FMS protocol layer information from address 50 in a second filter window. The user would select the appropriate settings from the filter settings window. The monitor would then concatenate the filters to produce a single concatenated filter for port 1. As packets are subsequently received at port 1, the concatenated filter produces filtered packets by eliminating all packet information not associated with the specified protocol layers and not originating from the specified network addresses. The filtered packets are routed to a buffer within fieldbus storage unit 39 and subsequently delivered to computer 40 over ISA bus 41 for analysis and display.

Figure 5:
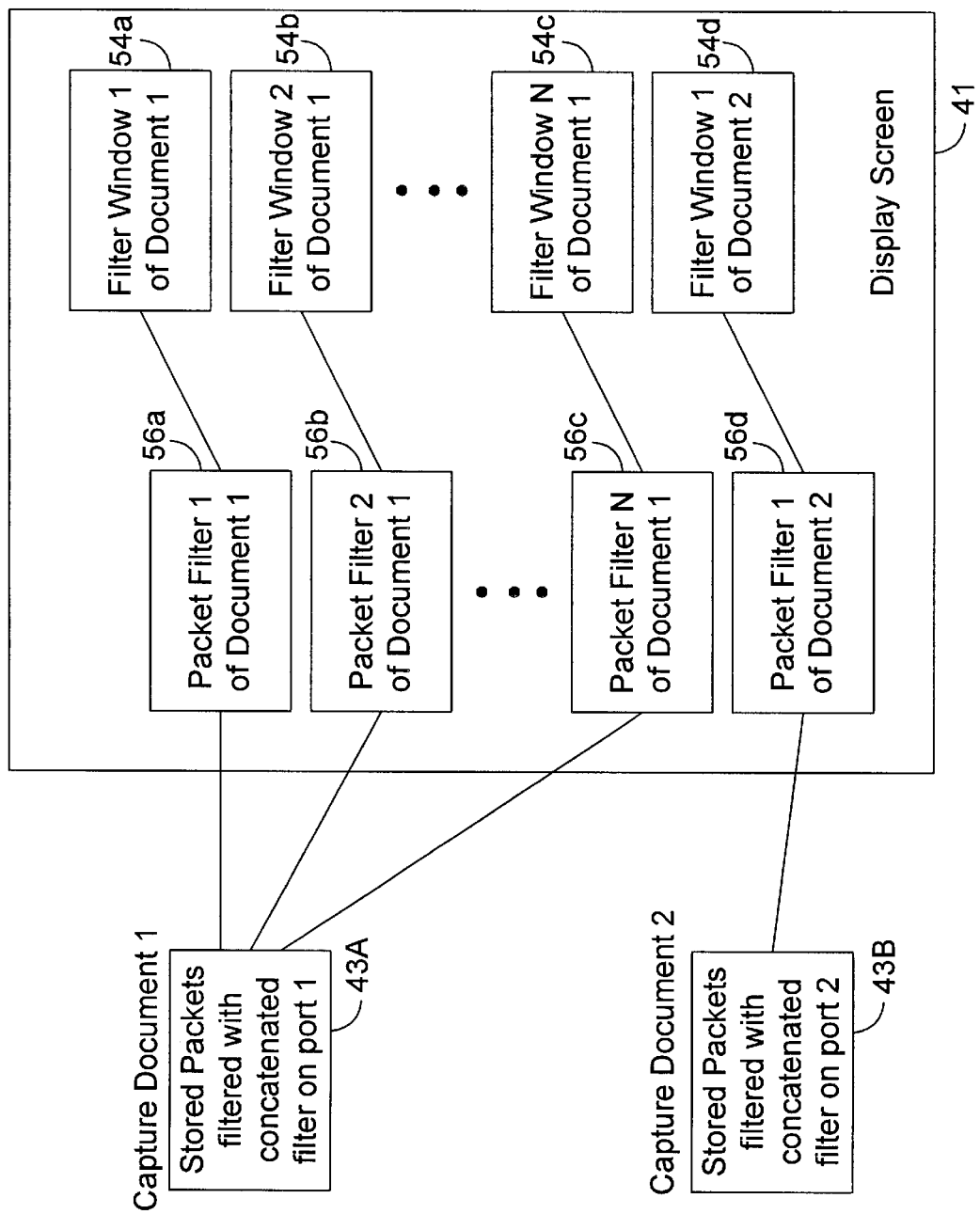
FIG. 5 is a block depiction of the multiple window display screen.

FIG. 5 is a block representation of the computer display of fieldbus monitor 14. Using the multiple window display capabilities of commercially available operating systems such as Microsoft Windows®, monitor 14 creates separate filter windows 54 on computer display screen 41 for each packet filter 56. In the example shown in FIG. 5, four different filter windows (54*a*, 54*b*, 54*c*, and 54*d*) are being displayed on display screen 52 of computer 40. Each filter window 54 is associated with a corresponding packet filter 56. As shown in the figure, the packet information displayed on the screen is generated from the capture documents 43A and 43B. Capture documents 43 contain information filtered from incoming packets using the concatenated filters referred to above. Monitor 14 processes and separates the filtered packets in capture documents 43 into different filter windows 54 according to the packet filters 56. The information associated with each packet filter 56 is displayed on display screen 52 in a corresponding display window 54. The format in which monitor 14 displays the information in each filter window 54 can vary according to user selections described in more detail below with respect to FIG. 10. FIG. 5 also demonstrates the ability of monitor 14 to display packets captured from more than one fieldbus. Each capture document 43 is associated with a different fieldbus 16.

Figure 6:
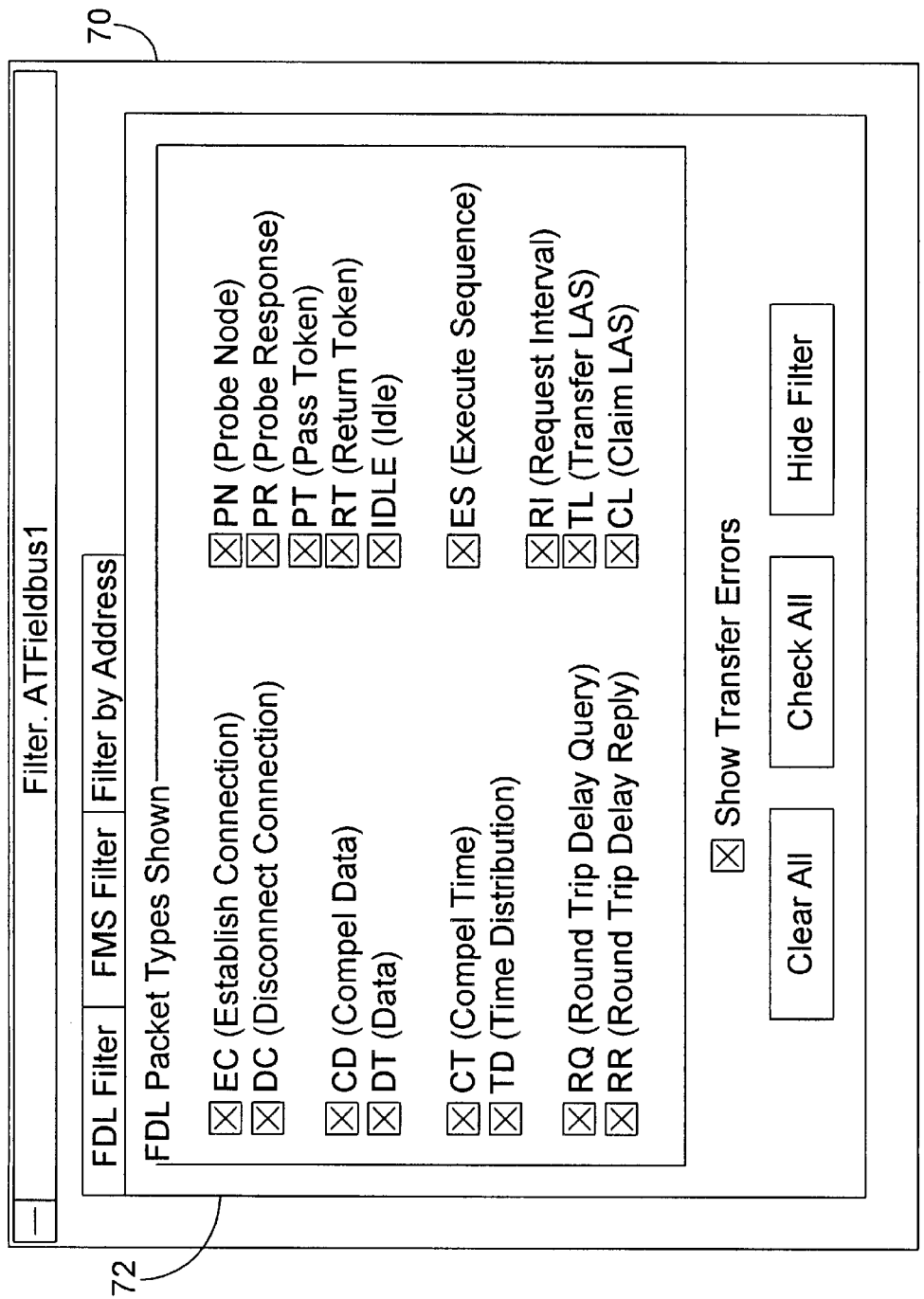
FIG. 6 is a depiction of the display screen for the FDL filter layer.
Figure 7:
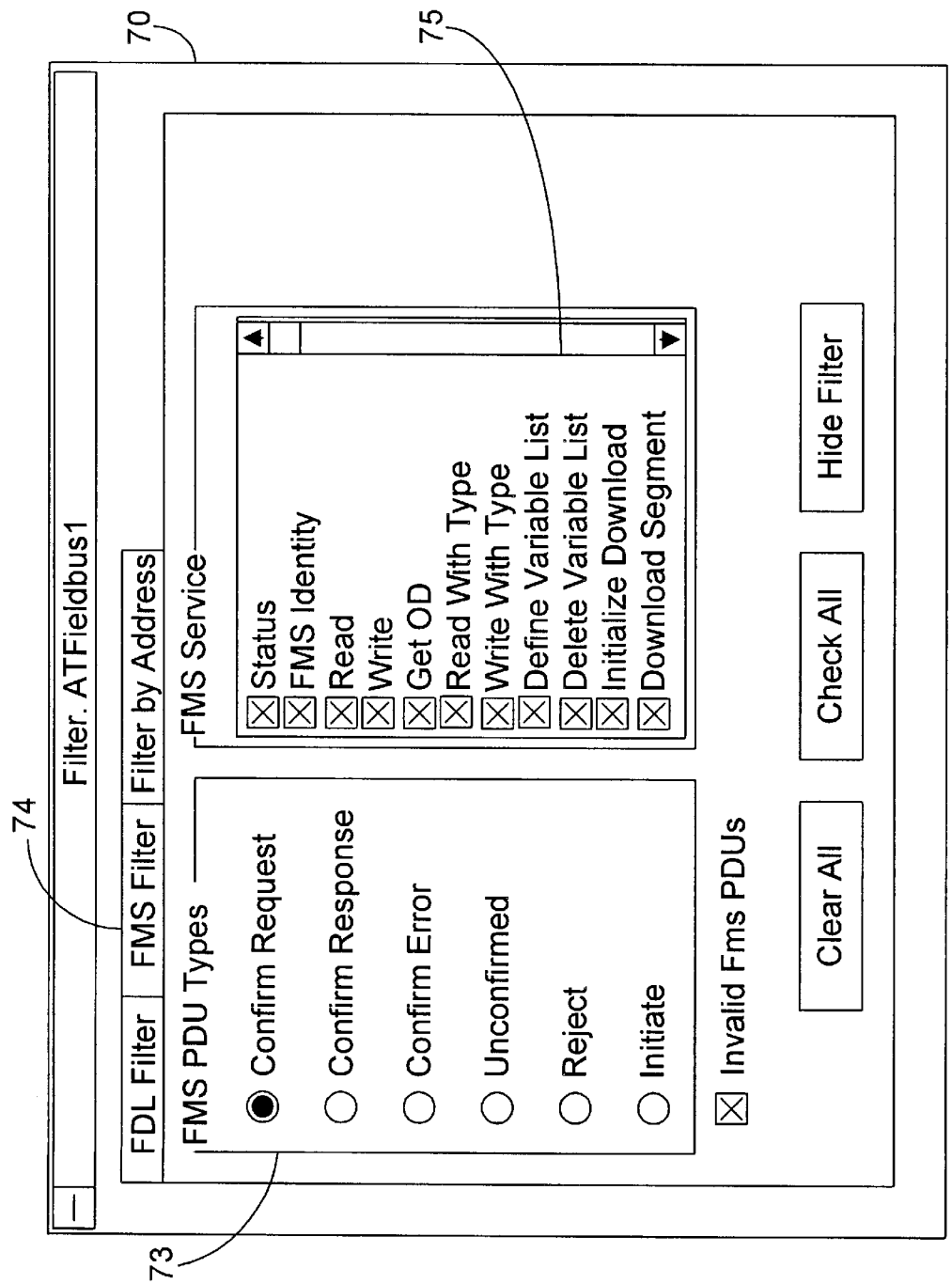
FIG. 7 is a depiction of a display screen for the FMS filter layer.
Figure 8:
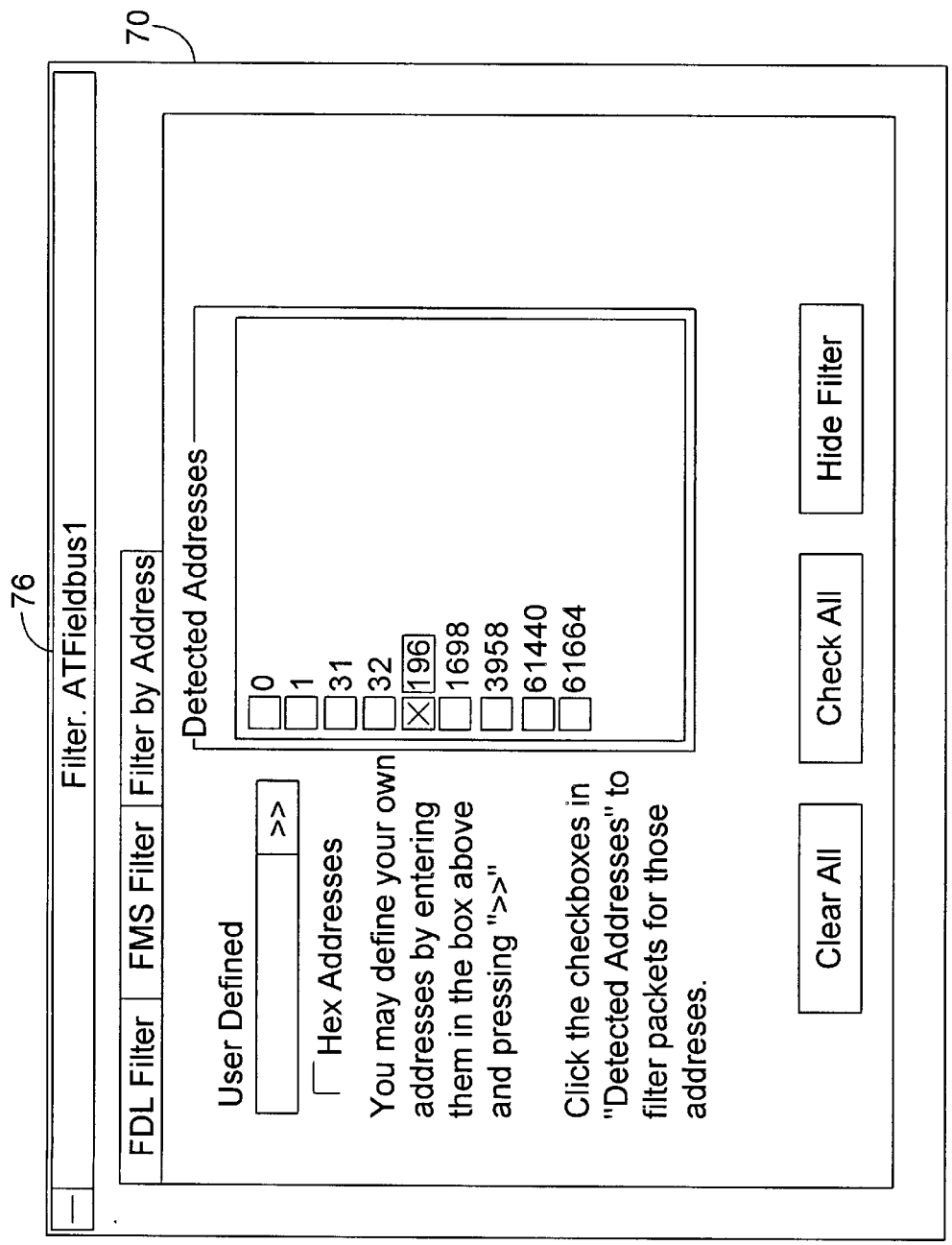
FIG. 8 is a depiction of a display screen for the Filter by Address filter option.

Turning now to FIGS. 6, 7, and 8, the available settings for each packet filter 56 are shown. As shown in the figures, filter display 70 is comprised of three separately selectable filter layers. FIG. 6 shows FDL filter layer setting 72. An improved monitor 14 hereof can select which FDL packet types to display or capture. By simply filling in or checking the boxes in the packet types desired, the user can easily select those FDL packet types he or she wishes to view. In the example shown in FIG. 6, all FDL packet types have been selected. Similarly, FIG. 7 shows the FMS filter layer settings interface 74 and FIG. 8 shows the address filter interface 76. Because of the large number of FMS services that monitor 14 can filter, FMS layer interface 74 divides the various services into six FMS PDU types as shown in FIG. 7. The user selects the desired PDU types from PDU selection box 73 and checks the desired services in services selection box 75. As its name implies, address filter 76 filters out packets originating only from specified fieldbus network addresses. Address filter interface is useful in screening large numbers of packets when the user's interest is in certain addresses only. During the capture of information, the three different filter layers are logically joined. If no addresses are selected in address filter interface 76, monitor 14 "OR's" the FDL layer filter and the FMS filter. If an one or more addresses are selected in address filter 76, monitor 14 screens incoming packets for the selected address prior to passing the packets through the FDL and FMS filters.

Figure 9:
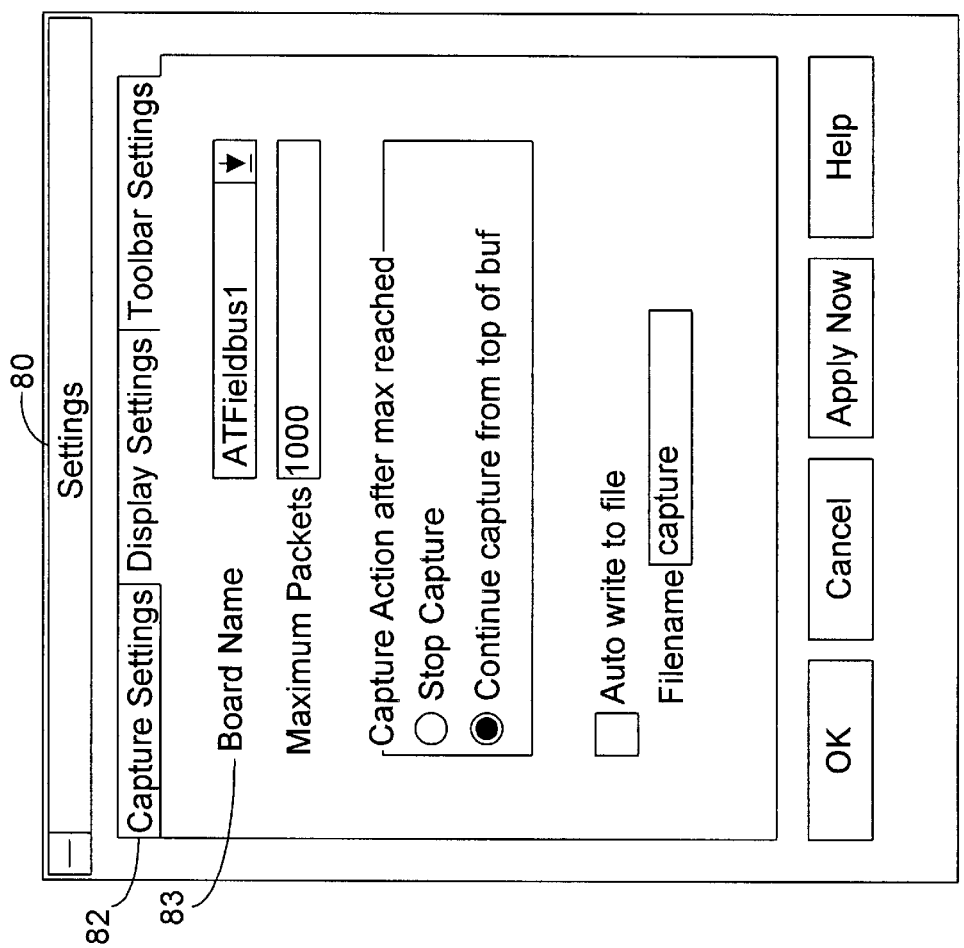
FIG. 9 is a depiction of an embodiment of the capture settings display screen.

FIG. 9 depicts the fieldbus settings interface 80 used to control capture, display, and toolbar settings. Using capture setting interface 82, the user enters the board name from which he or she desires to capture information in board selection window 83. The improved monitor 14 hereof is capable of capturing and displaying fieldbus packets from multiple fieldbuses simultaneously. A separate fieldbus board 13 (or a board supporting multiple fieldbus channels) must be installed into monitor 14 for each separate fieldbus.

Figure 10:
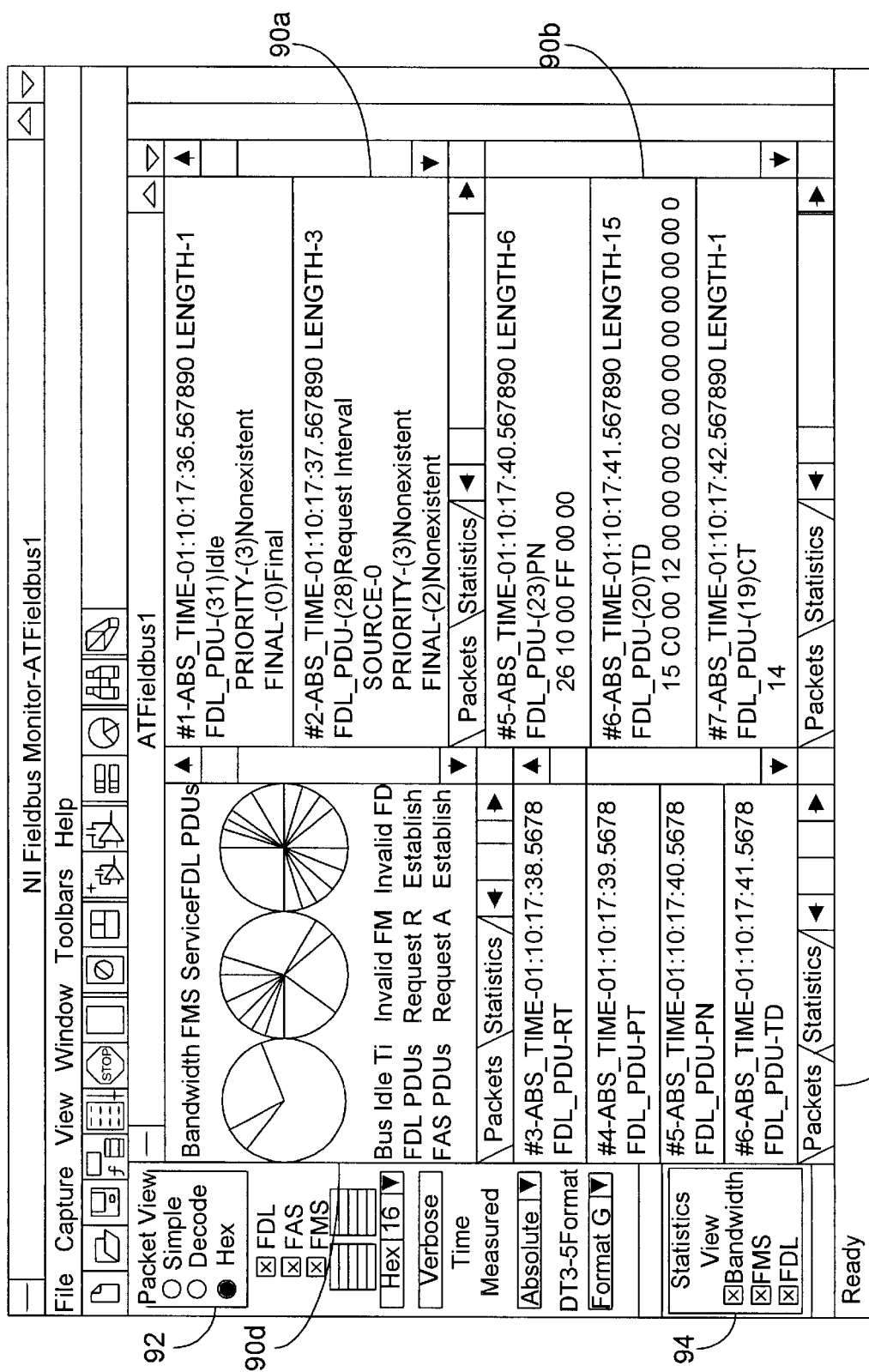
FIG. 10 depicts an embodiment of the packets view display screen.

FIG. 10 shows a multi-paned display of a single filter window. Monitor 14 is capable of displaying packet information in a variety of formats regardless of the filter used. In a preferred embodiment of the monitor 14, each filter window 54 may be split into as many as four filter window panes, shown in the drawing as 90*a, b, c*, and *d*. Filter window panes 90*a, b*, and *c* are packet views of the filtered packets. Packet view displays filtered information as a series of packets on the display screen. Using packet view selector 92, the user can choose one of three packet view formats for display. Filter window pane 90*b* shows the hex packet view format in which packets are displayed in hexadecimal format. Filter window pane 90*a*, shows filter packets being displayed using the decode packet view in which the packet information is decoded into its instructions. Filter packet window pane 90*c*, represents the simple packet view in which only the FDL PDU type is displayed. Filter window pane 90*d*, shows the filtered information being displayed in statistics view.

Figure 11:
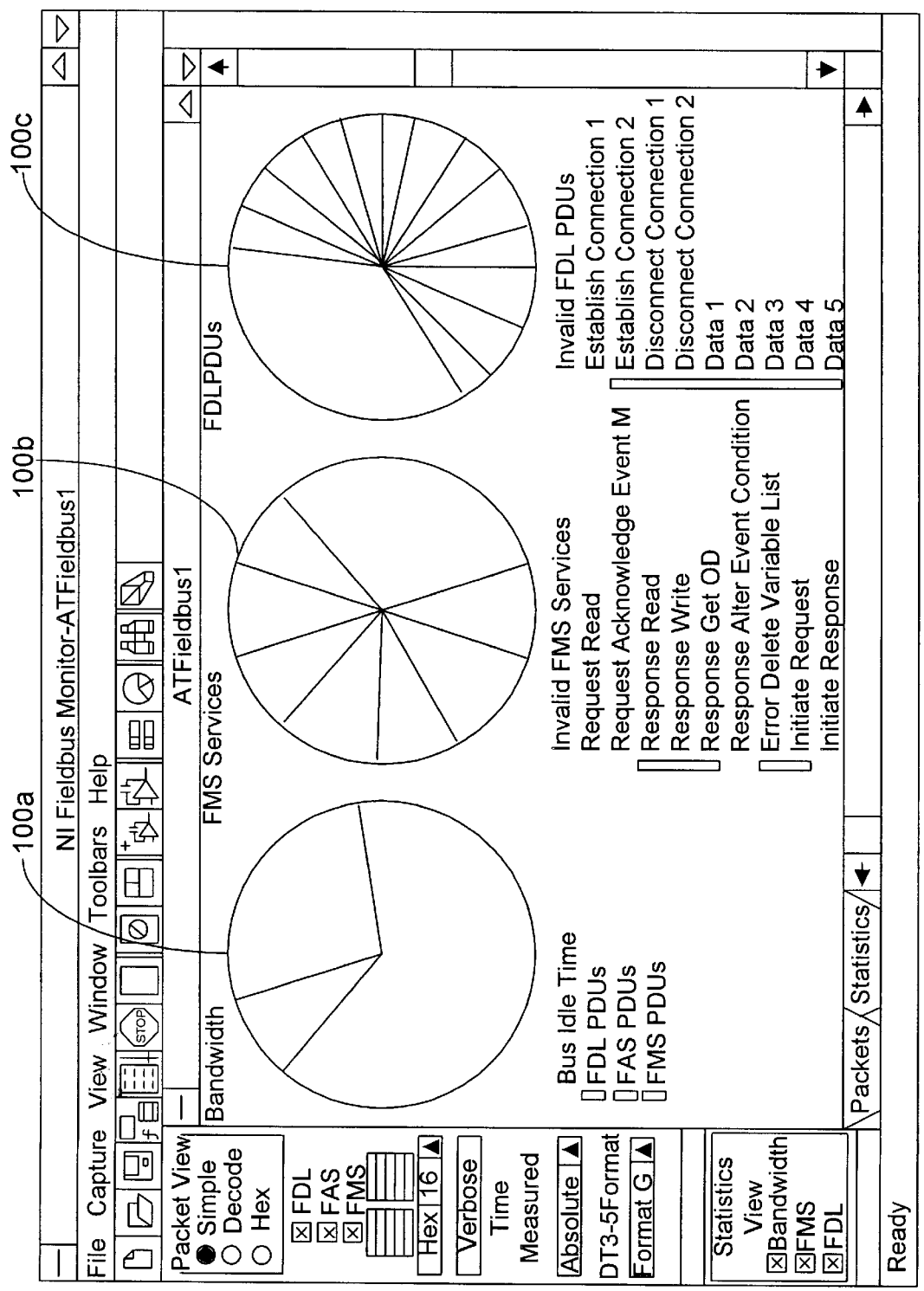
FIG. 11 depicts an embodiment of the statistics view display screen.

As shown in greater detail in FIG. 11, the statistics view shows the percentage of time or the amount of bandwidth used by each layer of the fieldbus protocol stack. In a preferred embodiment of monitor 14, the statistics view, displays information in as many as three different pie charts. Pie chart 100*a*, the band width pie chart, shows the percentage of the fieldbus bandwidth that the various fieldbus layers are consuming. Pie charts 100*b* and 100*c* further break down the FMS PDUs and the FDL PDU's to FMS Services and FDL PDU types respectively. Pie charts 100*b* and 100*c* are useful in determining which FMS Services and which FDL PDUs are being used most frequently on the fieldbus. This information can be useful in debugging and analyzing a fieldbus. Returning to FIG. 10, statistics view selector 94 is capable of selecting any of the three statistics view displays.

Figure 12:
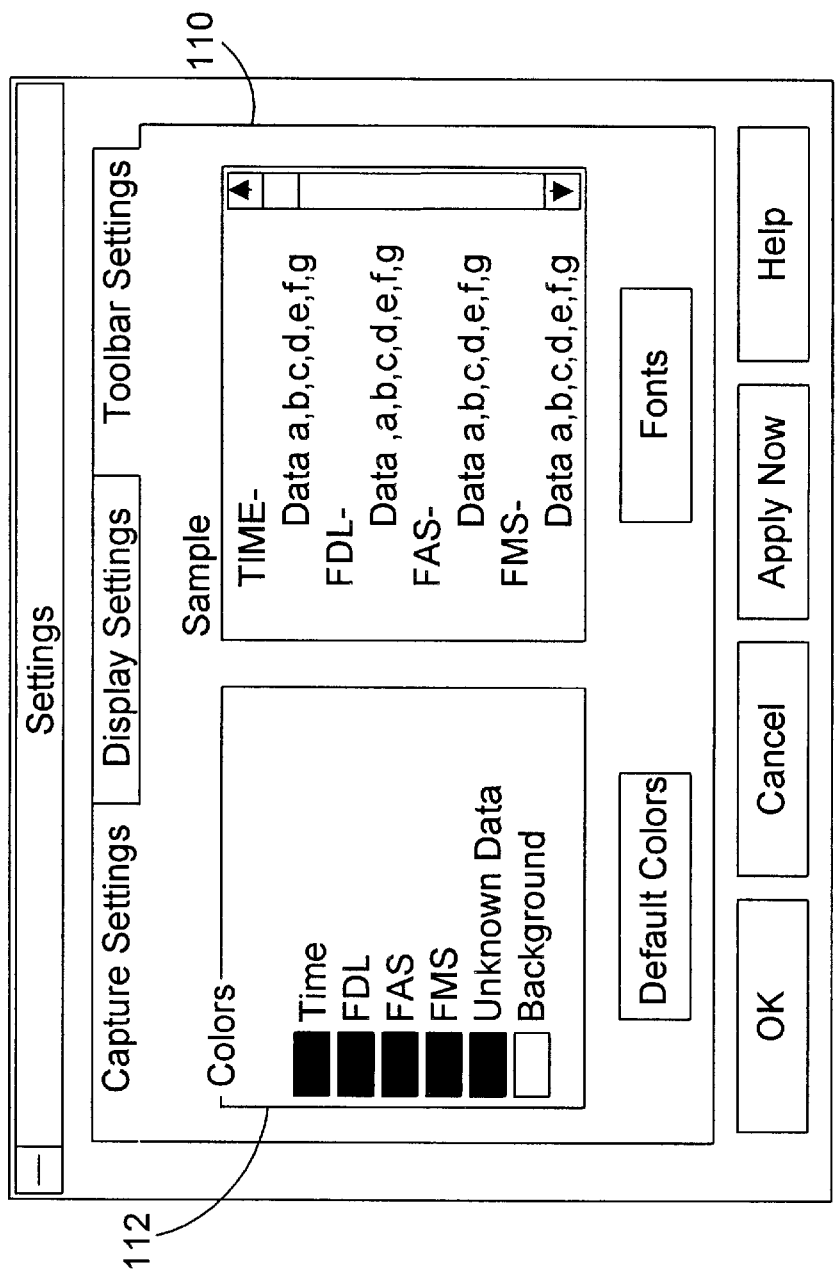
FIG. 12 is a depiction of an embodiment of the display settings screen.
Figure 13:
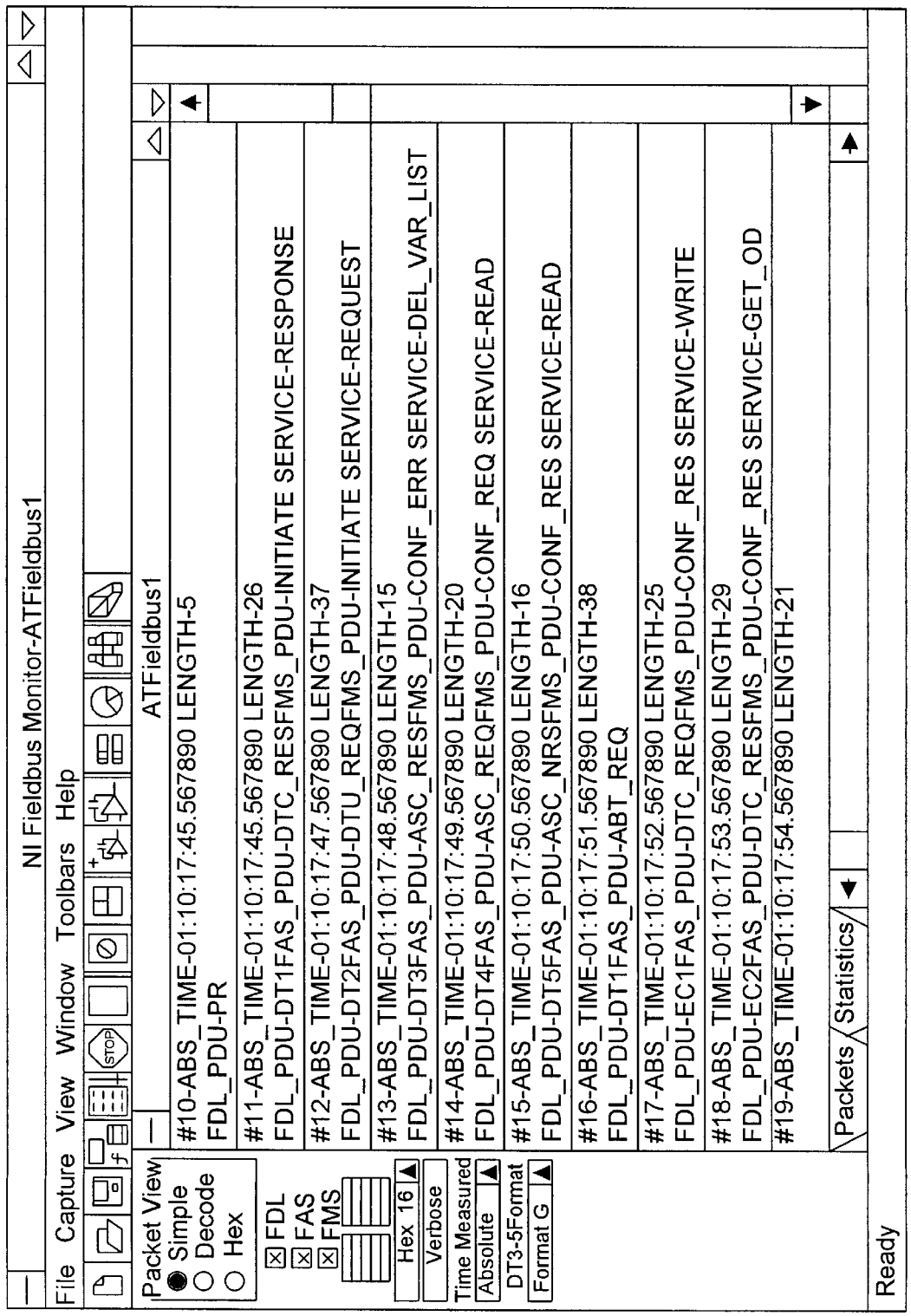
FIG. 13 depicts a split pane filter window showing the various display options available for a particular captured document.

FIG. 12 shows the display settings interface 110 of a preferred embodiment of monitor 14. Within display settings interface 110, the user can assign unique display colors to each packet layer with color selector box 112. In addition, interface 110 can assign separate colors to unknown information and to the time-of-day information. Especially when viewing packets in packet view, which is shown in greater detail in FIG. 13, assigning separate colors to the various information layers greatly enhances the readability of the display. FIG. 13 shows packets being display in the packet view using the simple mode. In addition to simple mode, in which only the PDU type of the packets are shown, monitor 14 can display packets in hex mode, shown as 90*b* in FIG. 10, and decode mode, shown as 90*a* in FIG. 10. Hex mode displays the hexadecimal code of the packet data in addition to the PDU types, while the decode mode translates the hexadecimal data into readable English. Although not easily seen in the black and white hardcopy of FIG. 13, the FDL, FMS, and FAS PDU are uniquely colored in accordance with monitor 14 hereof.

Figure 14:
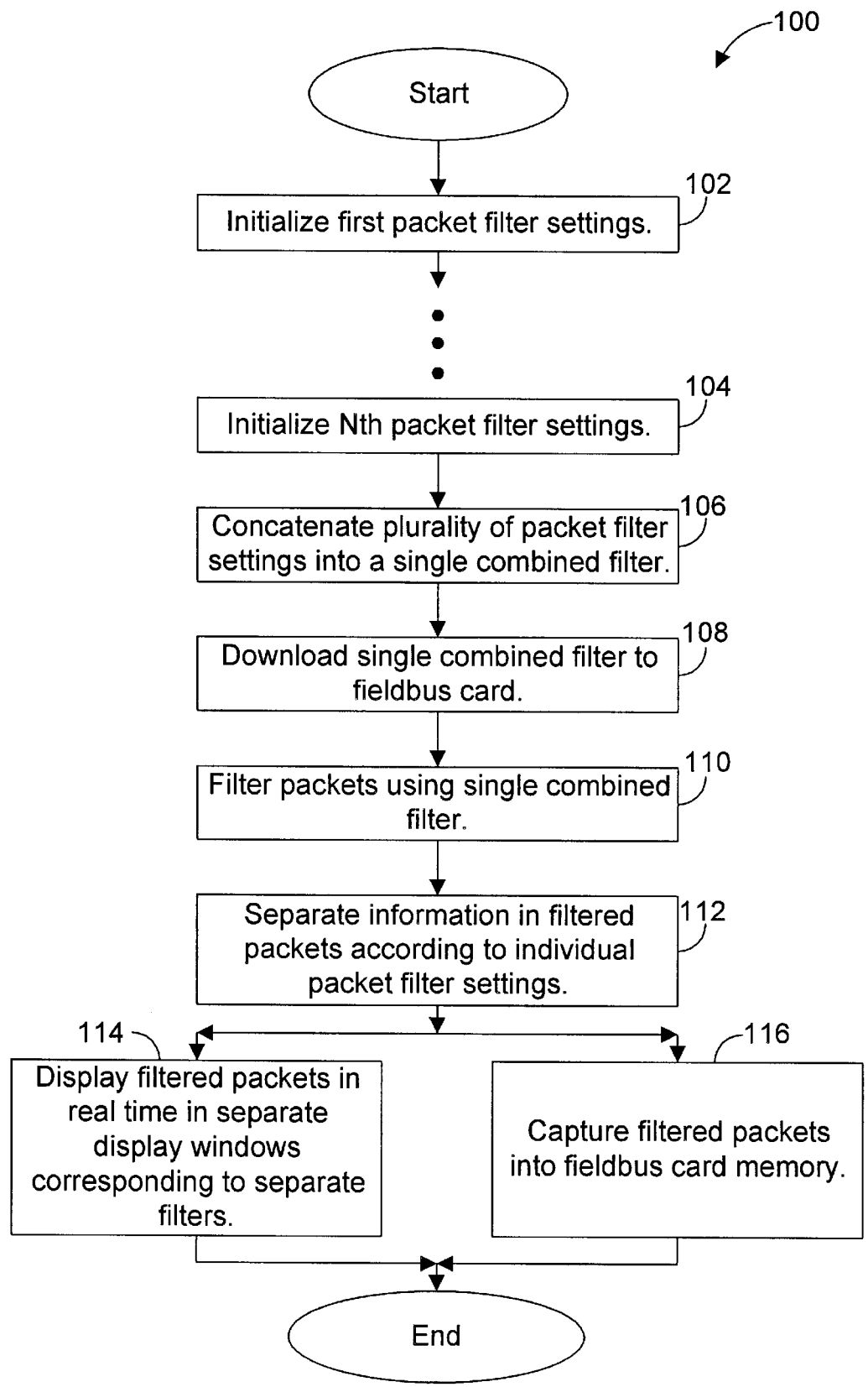
FIG. 14 is the flow diagram of an improved method for monitoring a field bus.
Figure 15:
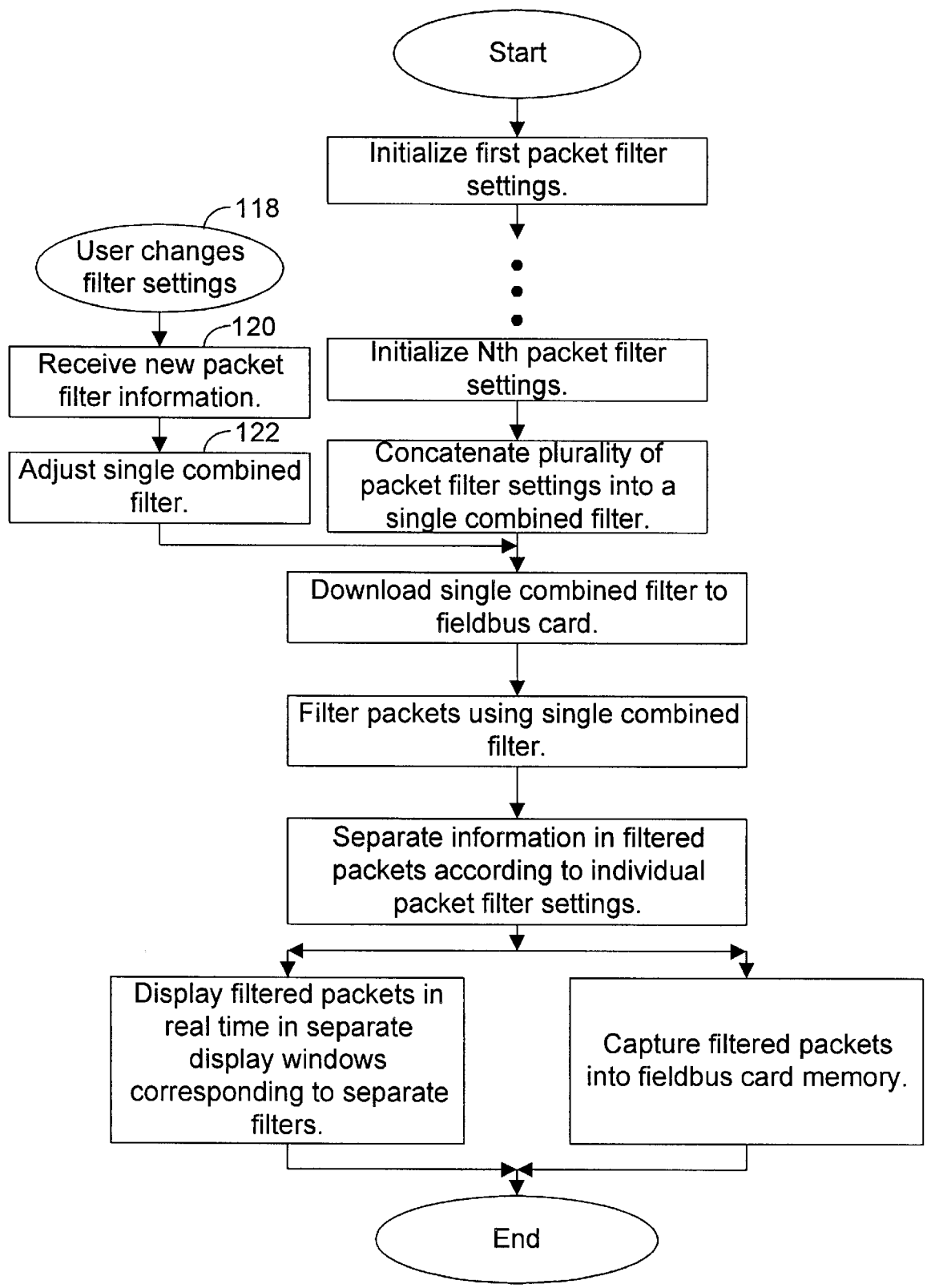
FIG. 15 is the flow diagram of FIG. 14, further incorporating dynamically altering of one or more filters.
Figure 16:
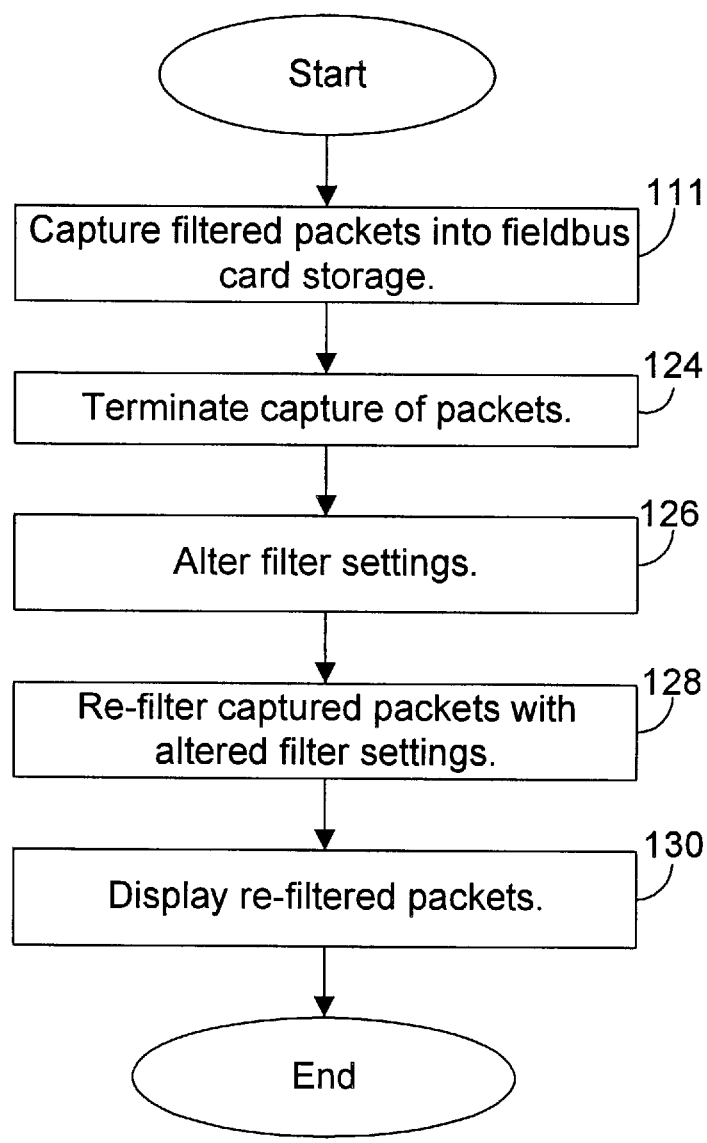
FIG. 16 is a flow diagram further showing post-capture filtering and displaying of packets.

Turning now to FIGS. 14 through 16, flow diagrams for an improved method of monitoring a field bus are shown. In FIG. 14, a method is shown for monitoring a field bus comprising initializing the settings for a first packet filter in step 102. Initializing a packet filter is accomplished by selecting any permutation of the information layer packets and network addresses described above in reference to FIGS. 6–10. If the user desires to use the multiple filter capability of the present invention, filter settings, preferably unique settings, are selected for each desired filter. The blank space between step 102 and step 104 in FIG. 14 represents this iterative process. In step 104, the "Nth" or final filter is set.

After all of the filter settings have been selected, the settings from the multiple filters are concatenated or combined (or ORed) together to create a single filter setting comprising a union of each individual filter setting. As a simple example, suppose the user desires a first filter to filter all FDL layer packets originating from fieldbus network address 32 and a second filter to filter all FMS packets originating from fieldbus network address 196. The user would open up a first packet filter dialog box, click on the "Check All" button of the FDL Filter menu shown in FIG. 6, and select address 32 from FIG. 8. The user would then open up a second packet filter dialog box, click the "Check All" button of the FMS Filter menu shown in FIG. 7, and select address 196. The improved fieldbus monitor then concatenates or combines these two packet filters in step 106 and downloads the single concatenated filter to the fieldbus card 13 in step 108. The single concatenated filter is then applied to the packets on the fieldbus network 16 to filter all FDL layer packets originating from address 32 and all FMS layer packets originating from address 196. This filtering step is shown as step 110 in FIG. 14. The improved fieldbus monitor then separates the packets associated with the first packet filter settings from the packets associated with the second packet filter settings in step 112. Thereafter, the improved monitor displays the first filter packets in a first display window and the second filter packets in a second display window as shown in step 114. The filtered packets could also be captured, as shown in step 116, by storing the filtered packets in fieldbus storage.

FIG. 15 is a flow diagram of one embodiment of the present invention illustrating the improved fieldbus monitor's ability to dynamically alter the filter settings. The dynamic altering of filters can occur at any time that the fieldbus monitor is filtering, capturing, and/or displaying packets as described above in reference to FIG. 14. To initiate the dynamic alteration process, the user simply edits the settings on the menus filter dialog box described above in reference to FIGS. 6-10. Once the user has completed altering the settings for a particular filter in step 118, the improved fieldbus monitor receives the updated packet information in step 120 and makes the necessary alterations to the single concatenated filter as shown in step 122. The improved fieldbus monitor then downloads the altered filter settings to the fieldbus card in step 108 and fieldbus monitoring continues as described above in reference to FIG. 14.

The present invention handles the dynamic altering of the filter settings "on the fly" such that it is unnecessary to interrupt the capturing of packets. With each new packet filter setting selection, a new filter is downloaded to fieldbus board 13. The improved fieldbus monitor handles the altered filter settings similar to the manner in which interrupts are handled by a microprocessor.

FIG. 16 depicts an embodiment of the present invention further incorporating the ability to perform post-capture filtering of information packets. This ability allows the user to focus on a subset of the information contained in the captured packets. In FIG. 16, the entire process of capturing packets as described above in reference to FIG. 14 is represented as step 111. After the capturing of filtered packets is terminated in step 124, the user can alter the filter settings in step 126. Continuing with the example started above in reference to FIG. 14, suppose that the user has captured a number of packets using the two filters described. The user could subsequently view only the Establish Connection (EC) and Disconnect Connection (DC) packet types originating from address 32 by altering the settings associated with the first filter. After so altering the filter settings, the present invention re-filters the captured packets in step 128 and displays the re-filtered packets in step 130. As another example, if a filter was initialized to capture FMS, FAS, and FDL layer packets during capture, the captured packets could be further filtered after termination of capture to produce packets displaying only the FMS layer information. The post-capture filtering of packets performed by the present invention does not destroy information so that the originally captured information remains accessible until to the user.

The exemplary embodiments shown are therefore merely exemplary of a single form of numerous forms. Various modifications and changes may be made to each and every processing step as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A method of monitoring fieldbus packets on a fieldbus network using a monitor configured on the fieldbus network to receive the fieldbus packets, wherein the monitor includes a display screen, the method comprising:

initializing two or more packet filters;

combining said two or more packet filters into a single combined filter;

filtering said fieldbus packets with said single combined filter to produce filtered data;

capturing said filtered data, wherein said capturing includes storing said filtered data in a memory of said fieldbus monitor; and separating said filtered data into filtered packet data for each of said two or more packet filters, wherein said separating is performed based on said two or more packet filters.

2. The method of claim 1 further comprising:

displaying in real-time said filtered packet data in two or more filter windows on said display screen of said monitor, wherein each said two or more filter windows corresponds to one of said two or more packet filters.

3. The method of claim 2 wherein each of the fieldbus packets comprises a plurality of information layers and originates from one of a plurality of network addresses, and wherein a unique display color is associated with each of said plurality of information layers.

4. The method of claim 1 wherein, wherein each of the fieldbus packets comprises a plurality of information layers and originates from one of a plurality of network addresses, and wherein said initializing includes:

selecting at least one permutation of said plurality of information layers and network addresses for each one of said two or more packet filters; and wherein said combining comprises logically concatenating said permutations of each of said two or more packet filters to produce a concatenated filter comprising a union of said permutations of each of said two or more packets filters.

5. The method of claim 4 wherein said separating comprises:

separating information contained in said information layers and network addresses in said filtered data filtered by said concatenated filter from said fieldbus packets; and grouping said separated information according to said two or more packet filters.

6. The method of claim 1 further comprising:

post capture filtering said captured packets with a modified filter.

7. The method of claim 6 further comprising:

displaying said post capture filtered packets on said display screen.

8. An apparatus for monitoring fieldbus packets on a fieldbus network, said fieldbus packets each comprising a plurality of information layers and originating from one of a plurality of network addresses, said apparatus comprising:

a packet receptor having an input and an output, said input coupled to said fieldbus network;

means for initializing two or more packet filters, wherein each of said two or more packet filters corresponds to a permutation of said plurality of information layers and network addresses;

means for combining said two or more packet filters to generate a concatenated filter corresponding to a union of said permutations of each of said two or more packet filters;

filter logic including an input connected to an output of said packet receptor, wherein said filter logic uses said concatenated filter to filter the fieldbus packets on the fieldbus network;

separating means for separating said filtered data into filtered packet data for each of said two or more packet filters, wherein said separating means operates based on said two or more packet filters; and a memory coupled to said filter logic for storing said filtered packet data.

9. The apparatus of claim 8 further comprising:

a display generator interfaced to said memory for displaying said filtered packet data.

10. The apparatus of claim 9 wherein said display generator generates two or more display windows, wherein each said two or more display windows corresponds to one of said two or more packet filters.

11. The apparatus of claim 8, further comprising;

means for dynamically modifying any of said permutations of said plurality of information layers and network addresses of said two or more packet filters.

12. The apparatus of claim 11 wherein said means for modifying said permutations of said plurality of information layers and network addresses operates without substantially interrupting operation of said filter logic filtering said fieldbus packet.

13. The apparatus of claim 8, wherein said means for initializing is adapted to initialize one or more post-capture filters, wherein said filter logic is adapted to filter one or more of said one or more captured packets with said one or more post-capture filters to produce one or more twice captured packets.

14. The apparatus of claim 13 wherein each said one or more post-capture filters corresponds to a subset of one of said one or more permutations of said plurality of information layers and network addresses.

* * * * *

UNITED STATES PATENT AND TRADEMARK OFFICE
CERTIFICATE OF CORRECTION

PATENT NO. : 5,850,523

DATED : December 15, 1998

INVENTOR(S) :

Robert E. Gretta, Jr.

It is certified that error appears in the above-identified patent and that said Letters Patent is hereby corrected as shown below:

```
Claim 4, col. 10, line 35, please delete "claim 1 wherein, wherein"
and substitute "claim 1 wherein ".
```

Signed and Sealed this

Thirtieth Day of March, 1999

Attest:

Q. TODD DICKINSON

Attesting Officer

Acting Commissioner of Patents and Trademarks